July 19, 1949.　　　　H. C. FLINT　　　　2,476,820
RESILIENT SEAT
Filed June 29, 1945　　　　　　　　　　2 Sheets-Sheet 1
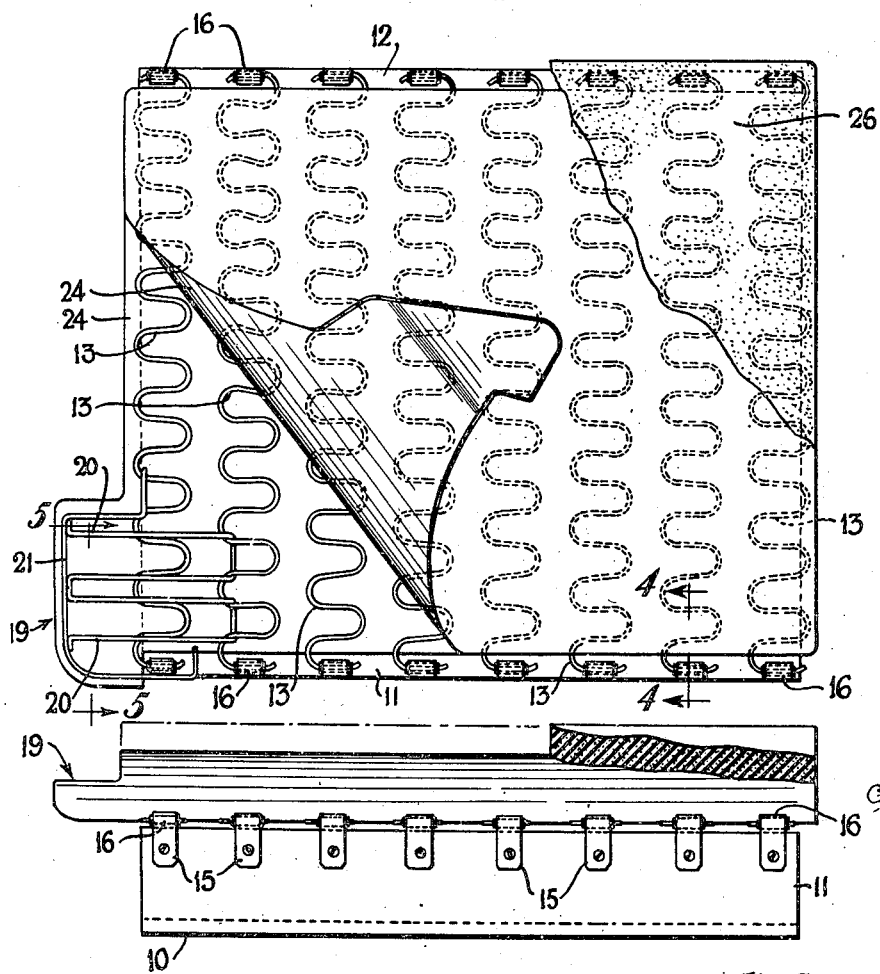
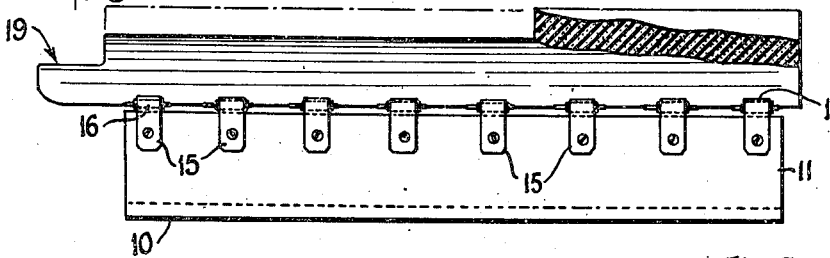
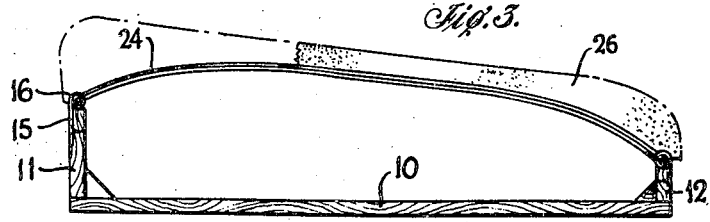
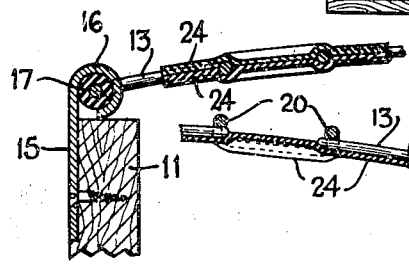
INVENTOR
HYLAND C. FLINT
ATTORNEYS July 19, 1949.  H. C. FLINT  2,476,820
RESILIENT SEAT Filed June 29, 1945  2 Sheets-Sheet 2

INVENTOR
HYLAND C. FLINT
ATTORNEYS

Patented July 19, 1949

2,476,820

UNITED STATES PATENT OFFICE 2,476,820

RESILIENT SEAT

Hyland C. Flint, Akron, Ohio, assignor to The Firestone Tire & Rubber Company, Akron, Ohio, a corporation of Ohio Application June 29, 1945, Serial No. 602,179

4 Claims. (Cl. 155—179)

This invention relates to resilient seats, and more especially it relates to resilient seats wherein the cushioning effect is achieved by the use of resilient springing in combination with resilient upholstery.

Heretofore, resilient seats such as are used in railway coaches, aircraft, busses and automobiles have been of two general types, namely, those that rely solely on coil springs for resilience and those that rely solely on cellular or foamed rubber composition. Neither has been entirely satisfactory. Experience has shown that a coil spring unit of over 4 inch height rapidly becomes unstable under compression, and tends to tilt laterally. Coil springs of less than 4 inches in height rapidly become hard or stiff in order to support the weight of a person in the limited space of travel available. Furthermore, a coil spring upon compression rapidly becomes inefficient as a resilient structure; in fact, it is likely that such a spring is efficient only for about 50% of its free length. Substantially the same objection applies to sponge or cellular rubber when used as the sole resilient supporting means. Under compression the cellular structure compacts and rapidly loses its yielding characteristic.

One expedient employed to overcome the foregoing objections to cellular rubber and to coiled springs is the use of springs made according to the invention of Kurt Kaden, U. S. Patent No. 2,002,399, issued May 21, 1935. These springs consist of units each composed of a single wire bent into a succession of sinuosities or undulations extending the entire length of the unit, the unit as a whole having an arcuate permanent set. Such spring units are mounted side by side in parallelism and their ends anchored, at which time their arc of curvature is substantially flattened as compared to normal. Upholstery material is mounted upon the convex side of the spring units. In use, this construction has proved unsatisfactory as a seat due to the lateral instability of the spring units, and, due to the fact that the units act individually, there is no cooperation between adjacent units. Thus the weight of a seated person is borne solely by the three or four medial spring units of the seat, the spring units disposed laterally thereof spreading sideways, thus producing a pronounced depression in the seat. In order to support the concentrated load, the gauge of the wire of the spring units had to be increased, resulting in hard riding and snappy spring back or recovery from deflection. Attempts have been made to remedy the aforementioned undesirable features by interconnecting the spring units. To this end helical springs, hairpin connectors and rope have been employed without success. In some cases the strain was too great and the connectors broke; if the connectors were of sufficient strength there was a loss of resilience. Furthermore, local connection between units created points of high strain concentration resulting in metal fatigue and failure. Accordingly, the Kaden type spring is employed effectively in the automotive field, only in back rests upon which relatively little weight is imposed.

The chief object of this invention is to provide a resilient seat advantageously employing both spring means and cellular rubber to obtain resilience. Another object is to devise a unitized seating surface structure employing a plurality of Kaden type spring elements and a textile fabric means for uniting, attaching and combining all of said spring elements. More specifically the invention aims to employ spring means of the Kaden type aforementioned in a novel manner to obtain optimum efficiency and seating comfort; to enable the use of Kaden type spring means composed of smaller gauge wire, thus effecting a saving in cost; to improve the operation of the seat with respect to rate change, that is, to reduce the extent of change in deflection characteristics of the respective spring elements thereof resulting from extended use of the seat; and to provide improved support and protection to the cellular rubber portion of the seat structure. Other objects will be manifest as the description proceeds.

Of the accompanying drawings:

Fig. 1 is a plan view of a resilient seat embodying the invention, a portion thereof being broken away and a portion stripped back to reveal underlying structure;

Fig. 2 is a front elevation thereof;

Fig. 3 is a side elevation thereof;

Fig. 4 is a section, on a larger scale, on the line 4—4 of Fig. 1;

Fig. 5 is a similar section on the line 5—5 of Fig. 1;

Figure 6:
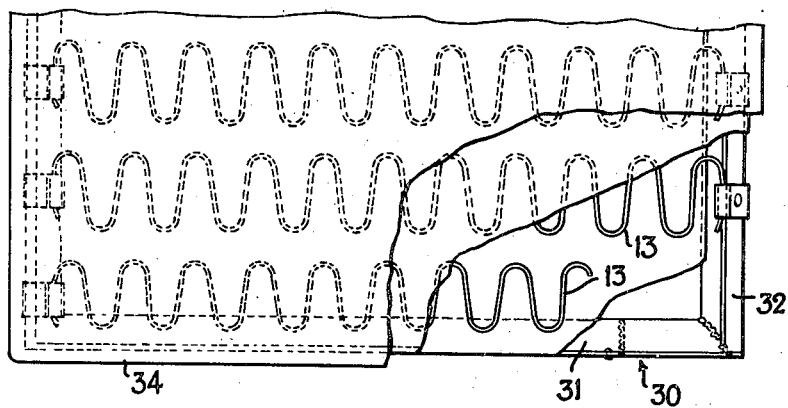
Fig. 6 is a fragmentary plan view of a modified embodiment of the invention.

Referring to Figs. 1 to 5 of the drawings, there is shown a seat structure comprising a frame consisting of a base 10, and front and rear rails 11, 12 respectively rising therefrom, the front rail being somewhat higher than the rear rail. Said frame as shown is composed of wood, although other suitable material may be used for the purpose if desired. Spanning the space between the rails 11, 12 is a series of wire spring units 13, 13 herein shown as eight in number, said spring units being arranged in parallelism and connected at their opposite ends to the front rail 11 and rear rail 12. Each spring unit is of the type that constitutes the subject matter of the Kaden patent aforementioned. It is composed of a single tempered wire bent into a succession of curves of sinuous or serpentine form extending the length of the unit. The unit also has an arcuate permanent set longitudinally on a relatively short radius. When mounted for use, with its convex side uppermost, the unit is somewhat flattened so as to have a longer radius of curvature. Thus upon vertical deflection the spring does not close upon itself and is continuously urged to return to its normal position, and retains its efficiency throughout the full extent of its vertical travel.

For mounting the spring units 13, identical anchor members 15 are mounted upon the front and rear rails 11, 12. Each anchor member consists of a metal strap affixed to the rail in vertical position, and having a terminal loop or eye 16 at its upper end, which eye is disposed above the top margin of the rail. The eye 16 of each anchor encircles a tubular resilient bushing 17 of rubber, and the terminal portion of a spring unit wire extends through said bushing. The arrangement prevents metal to metal contact of the spring units and anchor members thereby reducing wear and obviating squeaking, and also permitting a modicum of angular movement of the spring units.

The illustrative embodiment of the invention shown herein is designed for use in busses or similar vehicles that are provided with arm-rests, and where economy of space is essential. Accordingly the seat is provided with a local lateral offset portion, indicated at 19 in Figs. 1 and 2 of the drawing, which portion extends around the front end of an arm-rest to provide additional support to an occupant of the seat. To this end, spring wires 20,20 of hairpin shape are mounted with their closed ends hooked under adjacent loops of the spring unit 13 that lies next to the marginal spring unit at one side the seat. The remainder of each wire 20 overlies and rests upon the top of said marginal spring unit, and extends laterally therebeyond in overhanging relation thereto. The outer ends of the hairpin shaped wires 20 are connected to a bent spring wire 21 of irregular shape that is secured at one end to the marginal spring unit 13 and at its other end rests upon the top of front rail 11, said wire 21 defining the contour of the offset portion 19.

The several spring units 13 and the wires of offset portion 19, are disposed between two sheets of textile fabric 24, 24, the warp and weft strands of which preferably are arranged parallel to the sides of the seat-frame, and which are heavily rerubberized on their confronting faces. The fabric sheets 24 completely encase said spring units with the exception of the end portions thereof that are received in the anchor-eyes 16. The sheets 24 are firmly pressed together, and are bonded to each other and to the spring units by vulcanization. The vulcanization of the rubber coating of the fabric covers readily is effected if said coating is an air-curing composition. The fabric sheets 24 closely embrace the undulations of the wire of the spring units 13, as is clearly shown in Fig. 4, with the result that the units cannot move relatively of the fabric cover, and movement of any unit relatively of other units is translated to said other units.

Mounted upon the spring-seat structure described is a cushion element 26 of sponge or cellular rubber composition. This element is secured in place upon the seat in any preferred or known manner, and need not be thicker than one inch at its thinnest point. It will be understood that the seat in finished condition will be covered with the usual ornamental wear-resisting material (not shown).

The invention provides a spring support that possesses the desirable features inherent in the Kaden type spring, but which support functions as a unit in a manner not heretofore achieved by this type of spring unit. Thus the spring support functions as a unit, and since the fabric sheets 24 are longitudinally and transversely inextensible, locally applied load is distributed substantially over the entire area thereof. Because concentration of any load is obviated, it is possible to construct the spring units of lighter gauge wire. Tests have shown that resilient seats embodying the invention have a slower and smoother action than similar seats whereof the spring units are independent of each other and composed of heavier gauge wire. Furthermore, the major deflection under load occurs in the spring units, thereby enabling the use of a relatively thin sponge rubber cushion, whereby the advantageous features of such cushions are utilized, and undesirable features inherent in full-depth sponge rubber cushions are avoided. Moreover, the fabric cover on the spring units furnishes an excellent support for the cushion, and protects the bottom of the latter from wear against the spring wires.

Figure 7:
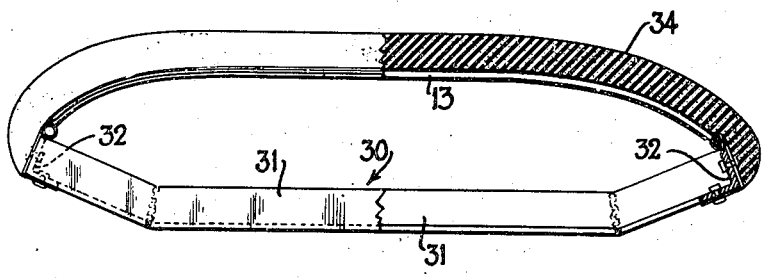
Fig. 7 is a front elevation thereof, a portion being broken away and in section.
Figure 8:
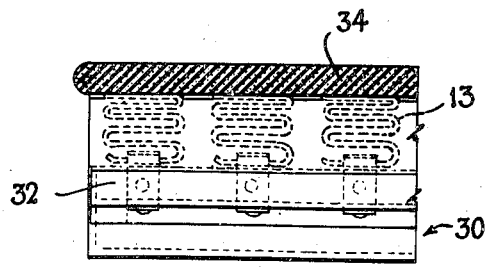
Fig. 8 is a fragmentary side elevation of the modified structure, a portion thereof being in section.

In the modified embodiment of the invention shown in Figs. 6 to 8, inclusive, the base, designated 30, is an open rectangular metal frame composed of angle iron, the transverse members 31, 31 of which are bent upwardly adjacent their ends, the side rails 32, 32 which extend from front to rear of the seat being thereby somewhat elevated. The wire spring units 13 of the seat, which are identical with the spring units of the previously described embodiment, are anchored to the side rails 32 so as to extend transversely of the seat instead of in fore-and-aft direction as previously described. In all other essential features the modified structure is similar to that previously described; the cushion element 34 may however, be shaped as shown in Fig. 7 so as to extend over the side rails 32.

Resilient seats of the modified construction described are more stable transversely of the seat than fore-and-aft thereof and give the seated person a high degree of security against side roll. This security is much greater than is possible in coil spring seats or seats with full depth cellular rubber cushions. There is also the advantage of the front edge being completely resilient under the seated person's legs. It was not comfortable and not considered desirable to sit on a seat composed of Kaden type springs extending transversely thereof prior to the application of the fabric layers, for the reason that the concentration of load is greater than when sitting on these springs running fore-and-aft. This is due to the bone structure of the body concentrating the weight of a seated person on two points, these points being positioned transversely on a seat with respect to each other. Therefore, it will be seen that these points will rest on a single spring unit extending transversely of the seat whereas said points being spaced from each other will span across approximately three spring units if the latter extend fore-and-aft of the seat. Experience has proved that with the application of the fabric layers encasing the springs the load is distributed completely to all units and over all the turns of the units and therefore the amount of deflection is substantially the same for the weight of a person whether imposed transversely or longitudinally of the spring units. It has thus been shown that this invention makes possible differential stability arranged to conform to any condition of convenience or necessity.

The invention provides a resilient seat that is comfortable to the occupant thereof, effects stability of the several spring units of the seat, and achieves the other advantages set out in the foregoing statement of objects.

Modification may be resorted to without departing from the spirit of the invention or the scope thereof as defined by the appended claims.

What is claimed is:

1. A resilient seat comprising a seat frame, a series of parallel upwardly arched flat spring units spanning the frame, means mounted on opposite sides of the frame to which the respective ends of the spring units are anchored, said means comprising tubular rubber bushings in which the spring-ends are received, and flexible sheet material bonded to all the sheet units and so interconnecting the same that they react in unison to locally applied stress.

2. A resilient seat comprising a seat frame, a series of parallel, transversely flat, upwardly arched wire spring units spanning the frame and connected to opposite sides thereof, wire elements connected to a marginal spring unit and spring unit adjacent thereto and overhanging the marginal spring unit so as to constitute a local offset region on the spring structure, and flexible sheet material bonded to the upper and under side of the spring structure including the offset region thereof to stabilize the individual sheet units and cause them to react in unison to locally applied stress.

3. A resilient seat comprising a seat frame, a series of parallel upwardly arched flat spring units spanning the frame and connected to opposite sides thereof, means mounted on opposite sides of the frame to which the respective ends of the spring units are anchored, said means comprising tubular rubber bushings in which the spring-ends are received, and sheets of textile material substantially coextensive with said spring units disposed on opposite sides thereof, said sheets bonded to the spring units and to each other whereby said units react in unison to locally applied stress.

4. A resilient seat comprising a seat frame, a series of parallel upwardly arched flat spring units spanning the frame and connected to opposite sides thereof, means mounted on opposite sides of the frame to which the respective ends of the spring units are anchored, said means comprising tubular rubber bushings in which the spring-ends are received, sheets of textile material substantially coextensive with said spring units disposed on opposite sides thereof, said sheets bonded to the spring units and to each other whereby said units react in unison to locally applied stress, and a sponge rubber cushion supported by the spring units and resting upon said fabric cover.

HYLAND C. FLINT.

REFERENCES CITED

The following references are of record in the file of this patent:

UNITED STATES PATENTS

| Number | Name | Date |
| --- | --- | --- |
| Re. 21,263 | Kaden | Nov. 14, 1939 |
| 1,085,269 | King et al. | Jan. 27, 1914 |
| 2,146,136 | Foote | Feb. 7, 1939 |
| 2,247,543 | Bernstein | July 1, 1941 |
| 2,312,411 | Hopkes | Mar. 2, 1943 |
| 2,371,954 | Cunningham | Mar. 20, 1945 |

FOREIGN PATENTS

| Number | Country | Date |
| --- | --- | --- |
| 497,730 | Great Britain | Mar. 20, 1937 |
| 693,481 | France | Aug. 25, 1930 |